US011780674B2

United States Patent
Yu et al.

(10) Patent No.: US 11,780,674 B2
(45) Date of Patent: Oct. 10, 2023

(54) MOBILITY FOR DELIVERY

(71) Applicants: Hyundai Motor Company, Seoul (KR); Kia Corporation, Seoul (KR)

(72) Inventors: Geun Sang Yu, Gongju-si (KR); Hun Keon Ko, Anyang-si (KR); Jae Hong Jung, Seoul (KR); Joo Young Chun, Seoul (KR); Ho Seong Kang, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/834,034

(22) Filed: Jun. 7, 2022

(65) Prior Publication Data

US 2023/0183003 A1 Jun. 15, 2023

(30) Foreign Application Priority Data

Dec. 14, 2021 (KR) .......................... 10-2021-0178961

(51) Int. Cl.
*B65G 17/12* (2006.01)
*B65G 1/04* (2006.01)
*B65G 65/38* (2006.01)
*B65G 1/127* (2006.01)

(52) U.S. Cl.
CPC ........... *B65G 1/0492* (2013.01); *B65G 1/127* (2013.01); *B65G 65/38* (2013.01)

(58) Field of Classification Search
None
See application file for complete search history.

(56) References Cited

U.S. PATENT DOCUMENTS 3,024,891 A * 3/1962 Sawrie ................ B65G 17/123
198/799
3,223,260 A * 12/1965 Bright ....................... B66F 9/06
414/508
3,631,966 A * 1/1972 Katayama ............ B65G 17/123
198/799

(Continued)

FOREIGN PATENT DOCUMENTS

CN 105858040 A 8/2016
CN 207696516 U 8/2018

(Continued)

OTHER PUBLICATIONS

Youtube, "TVC Vertical Elevators", Apr. 6, 2011, retrieved from https://www.youtube.com/watch?v=L9i1G7zK5EU, 31 total pages.

*Primary Examiner* — Joseph A Dillon, Jr.
(74) *Attorney, Agent, or Firm* — Slater Matsil, LLP

(57) ABSTRACT

An embodiment mobility for delivering articles includes a frame defining a body of the mobility, a chain member coupled to a first side of the frame, wherein the chain member has a closed curve shape along an up-down direction, is movable relative to the frame, and includes a standby section provided at a fixed position with respect to the frame irrespective of a movement of the chain member, wherein the standby section includes a plurality of bent areas, a tray member having a first side coupled to the chain member, the tray member being movable in connection with a movement of the chain member, a wheel coupled to a lower portion of the frame, and a driver configured to provide a driving force to the chain member.

20 Claims, 9 Drawing Sheets

(56) References Cited

U.S. PATENT DOCUMENTS

| | | | | |
|---|---|---|---|---|
| 3,679,074 A | * | 7/1972 | Kuehl | B60P 1/44 |
| | | | | 296/57.1 |
| 3,684,079 A | * | 8/1972 | Kuehl | B65G 17/123 |
| | | | | 198/799 |
| 3,756,378 A | * | 9/1973 | Kuehl | B65G 17/34 |
| | | | | 198/849 |
| 4,465,177 A | * | 8/1984 | Dorner | B65G 47/57 |
| | | | | 198/799 |
| 4,627,530 A | * | 12/1986 | Franke | B65G 17/123 |
| | | | | 198/799 |
| 4,739,876 A | * | 4/1988 | Ammeraal | B65G 67/603 |
| | | | | 198/594 |
| 4,775,045 A | | 10/1988 | Kuehl | |
| 5,788,057 A | * | 8/1998 | Walser | B65G 47/5122 |
| | | | | 211/121 |
| 7,011,206 B2 | * | 3/2006 | Hornhofer | B65G 17/123 |
| | | | | 198/797 |
| 7,025,191 B2 | * | 4/2006 | Lichti | B65G 1/127 |
| | | | | 198/799 |
| 7,540,367 B2 | * | 6/2009 | Terui | H05K 13/021 |
| | | | | 198/801 |
| 8,820,512 B2 | * | 9/2014 | Sugiura | B65G 17/32 |
| | | | | 198/803.14 |
| 9,790,036 B2 | * | 10/2017 | Roehring | B65G 43/10 |
| 10,035,649 B2 | | 7/2018 | Lert et al. | |
| 10,239,691 B2 | | 3/2019 | Lert et al. | |
| 10,442,622 B2 | | 10/2019 | Lert et al. | |
| 10,556,743 B2 | | 2/2020 | Sullivan et al. | |
| 11,225,380 B2 | * | 1/2022 | Czapp | B65G 47/57 |
| 11,267,657 B2 | * | 3/2022 | Wang | B65G 35/08 |
| 2004/0079620 A1 | * | 4/2004 | Aleshire | A47B 49/00 |
| | | | | 312/249.8 |
| 2022/0315084 A1 | * | 10/2022 | Nishii | B65G 69/003 |

FOREIGN PATENT DOCUMENTS

| | | | | |
|---|---|---|---|---|
| CN | 210709149 U | | 6/2020 | |
| CN | 111689110 A | * | 9/2020 | B65G 1/0492 |
| JP | 2002068413 A | | 3/2002 | |
| JP | 2020132281 A | | 8/2020 | |
| KR | 20030023028 A | | 3/2003 | |
| KR | 102167775 B1 | | 10/2020 | |

* cited by examiner

MOBILITY FOR DELIVERY

CROSS-REFERENCE TO RELATED APPLICATIONS

This application claims the benefit of Korean Patent Application No. 10-2021-0178961, filed on Dec. 14, 2021, which application is hereby incorporated herein by reference.

TECHNICAL FIELD

Exemplary embodiments relate to a mobility for delivery.

BACKGROUND

Regarding a mobility for delivery which delivers an article and unloads the article at a destination, it is preferable that a plurality of articles are stacked in an up-down direction and then delivered in order to maximize the efficiency of delivery of articles. To this end, according to the related art, there are many cases in which a chain structure disposed in the up-down direction and a plurality of plate members coupled to the chain structure so as to support articles are provided in the mobility for delivery.

In this case, a process is performed which ejects to the outside the article provided on the plate member provided at the lower end of the mobility while rotating a chain after disposing the articles on the plurality of plate member and lowers the plate member positioned above again to the lower end and ejects the article to the outside.

However, according to the related art, the chain continues to rotate during the ejection of the article, and thus, the plate member positioned above also continues to move downward during the ejection of the article provided on the plate member provided at the lower end. Accordingly, it was necessary to secure a large gap between the plate members in the up-down direction. Due to this, there was a limitation in that the height of the mobility for delivery increases.

SUMMARY

Exemplary embodiments relate to a mobility for delivery. Particular embodiments relate to a mobility for delivery which has a structure capable of sequentially unloading a plurality of articles.

Exemplary embodiments of the present invention provide for reducing a height of a mobility for delivery, on which a plurality of articles are stacked in an up-down direction and which can sequentially eject the plurality of articles.

An exemplary embodiment of the present invention provides a mobility for delivery capable of delivering articles, the mobility including a frame unit forming a body of the mobility, a chain member which is coupled to one side of the frame unit, has a closed curve shape along an up-down direction, and is provided movable relative to the frame unit, a tray member of which one side is coupled to the chain member and which is provided movable in connection with the movement of the chain member, a wheel unit coupled to a lower portion of the frame unit, and a driving unit configured to provide a driving force to the chain member, wherein the chain member includes a standby section including a plurality of bent areas, and the standby section is provided at a fixed position with respect to the frame unit irrespective of the movement of the chain member.

The mobility may include a coupling unit which is coupled to the one side of the frame unit and includes one or more rotary members provided revolvably, wherein the standby section is formed in sections, which engage with the rotary members provided in the coupling unit, of the chain member.

The rotary members may include a first rotary member and a second rotary member provided above the first rotary member, wherein the bent areas include a first bent area formed in a manner in which the chain member extends downward and is then bent upward after surrounding a lower area of the first rotary member, and a second bent area formed in a manner in which the chain member, which passes through the first bent area and extends to the second rotary member, extends upward from the first rotary member to the second rotary member and is then bent downward after surrounding an upper area of the second rotary member.

The rotary members may further include a third rotary member provided below the second rotary member, and the bent areas may further include a third bent area formed in a manner in which the chain member, which passes through the second bent area and extends to the third rotary member, extends downward from the second rotary member to the third rotary member and is then bent upward after surrounding a lower area of the third rotary member.

The rotary members may further include a fourth rotary member provided above the third rotary member, and the bent areas may further include a fourth bent area formed in a manner in which the chain member, which passes through the third bent area and extends to the fourth rotary member, extends upward from the third rotary member to the fourth rotary member and is then bent downward after surrounding an upper area of the fourth rotary member.

The rotary members may further include a fifth rotary member provided below the fourth rotary member, and the bent areas may further include a fifth bent area formed in a manner in which the chain member, which passes through the fourth bent area and extends to the fifth rotary member, extends downward from the fourth rotary member to the fifth rotary member and is then bent after surrounding a lower area of the fifth rotary member.

The first rotary member may be provided behind the second rotary member, the second rotary member may be provided behind the third rotary member, and the third rotary member may be provided behind the fourth rotary member.

The fifth bent area may have a shape that is bent rearward after surrounding the lower area of the fifth rotary member.

The frame unit may include an up-down extension area having a shape extending in an up-down direction and a front-rear extension area having a shape extending in a front-rear direction, wherein the up-down extension area includes a front up-down extension area provided in the front of the frame unit and a rear up-down extension area provided in the rear of the frame unit, wherein the front-rear extension area includes an upper front-rear extension area configured to connect an upper end of the front up-down extension area and an upper end of the rear up-down extension area and a lower front-rear extension area configured to connect a lower end of the front up-down extension area and a lower end of the rear up-down extension area, wherein the chain member includes a first chain member which has a closed curve shape extending sequentially along longitudinal directions of the front up-down extension area, the upper front-rear extension area, the rear up-down extension area, and the lower front-rear extension area.

The chain member may further include a second chain member which has a closed curve shape extending sequentially along the longitudinal directions of the rear up-down extension area and the lower front-rear extension area, wherein the second chain member extends upward along the rear up-down extension area and then extends downward after being bent in an area facing the upper end of the rear up-down extension area, and extends forward along the lower front-rear extension area and then extends rearward after being bent in an area facing a front end of the lower front-rear extension area.

Each of the front up-down extension area, the rear up-down extension area, the upper front-rear extension area, and the lower front-rear extension area may be provided in a pair respectively in a left area and a right area of the frame unit, wherein the frame unit further includes a left-right extension area configured to connect the left area and the right area of the frame unit.

The tray member may include a plurality of rods which each have a shape extending in a left-right direction and are sequentially arrayed along the front-rear direction and a link module coupled to each of both left and right end portions of the plurality of rods, wherein the link module includes a plurality of links sequentially arrayed along the front-rear direction, and two neighboring links of the plurality of links are coupled rotatably relative to each other.

The tray member may further include a connection block provided in at least one of the plurality of links provided in the link module, and the tray member may be coupled to each of the first chain member and the second chain member through the connection block.

The connection block may include a front connection block provided in a front area of the link module and a rear connection block provided in a rear area of the link module, wherein the front connection block is coupled to the first chain member and the rear connection block is coupled to the second chain member.

The tray member may further include an upward protruding block that protrudes upward from the link module.

The coupling unit and the standby section may be provided in plurality in each of the front up-down extension area and the rear up-down extension area, and the tray member may be provided in plurality.

When all of the plurality of rods provided in any one tray member of the plurality of tray members are arrayed along the front-rear direction, all of the plurality of rods provided in another tray member of the plurality of tray members may be also arrayed along the front-rear direction.

When all of the plurality of rods provided in each of the plurality of tray members are arrayed along the front-rear direction, each of a length of the standby section of the first chain member and a length of the standby section of the second chain member may be greater than a length of the frame unit in the front-rear direction.

The driving unit may include a first rotary shaft provided in a rear end portion of the lower front-rear extension area, the first chain member and the second chain member may be engaged with the first rotary shaft, and the first chain member may be provided outside the second chain member in the left-right direction.

The mobility may further include a tension adjustment unit coupled to the lower front-rear extension area and a second rotary shaft coupled to a front end portion of the lower front-rear extension area and engaged with the chain member, wherein the tension adjustment unit is coupled to the second rotary shaft to move the second rotary shaft in the front-rear direction.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF ILLUSTRATIVE EMBODIMENTS

Hereinafter, a mobility for delivery according to embodiments of the present disclosure will be described with reference to the drawings.

Mobility for Delivery

Figure 1:
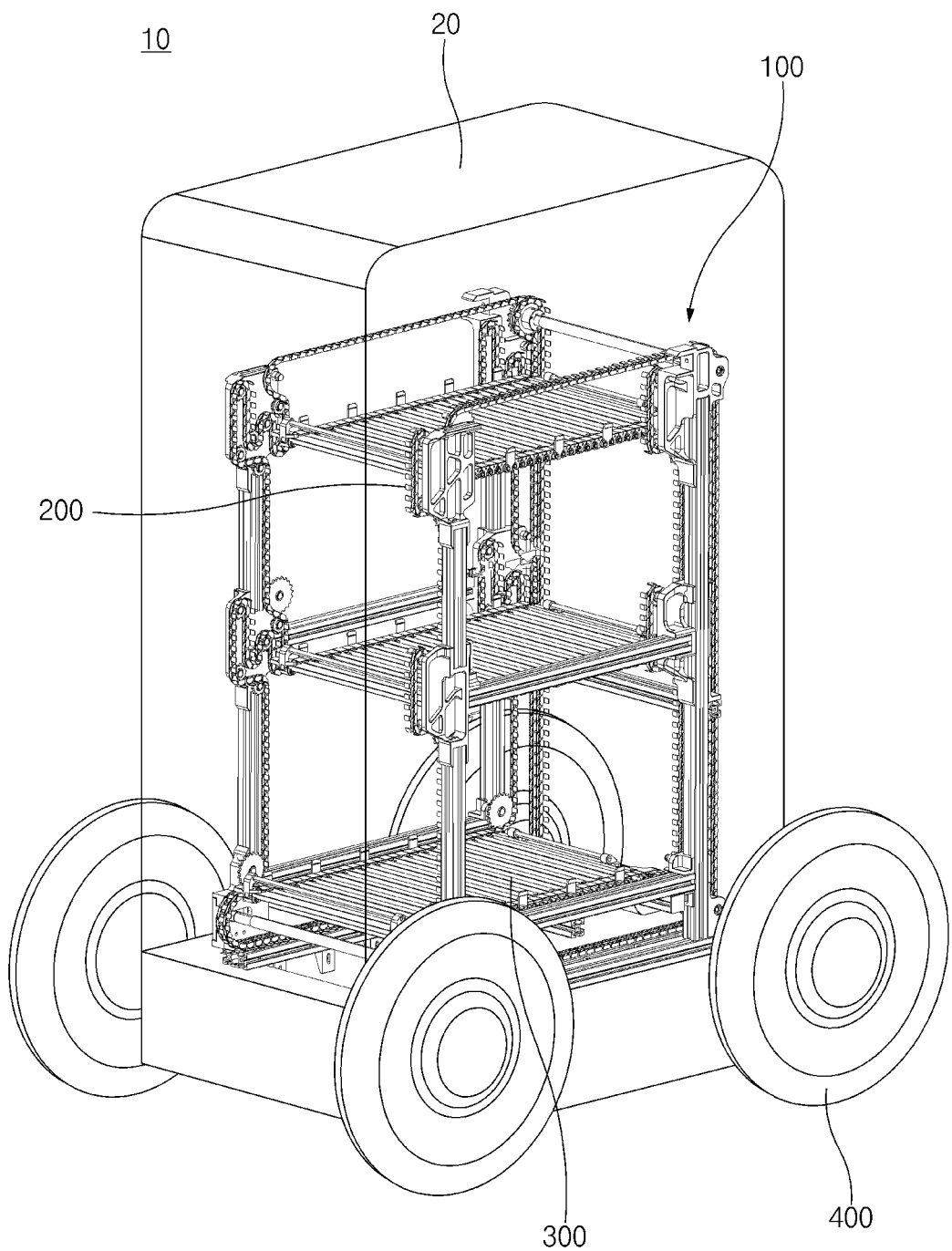
FIG. 1 is a perspective view illustrating a structure of a mobility for delivery according to embodiments of the present disclosure.
Figure 2:
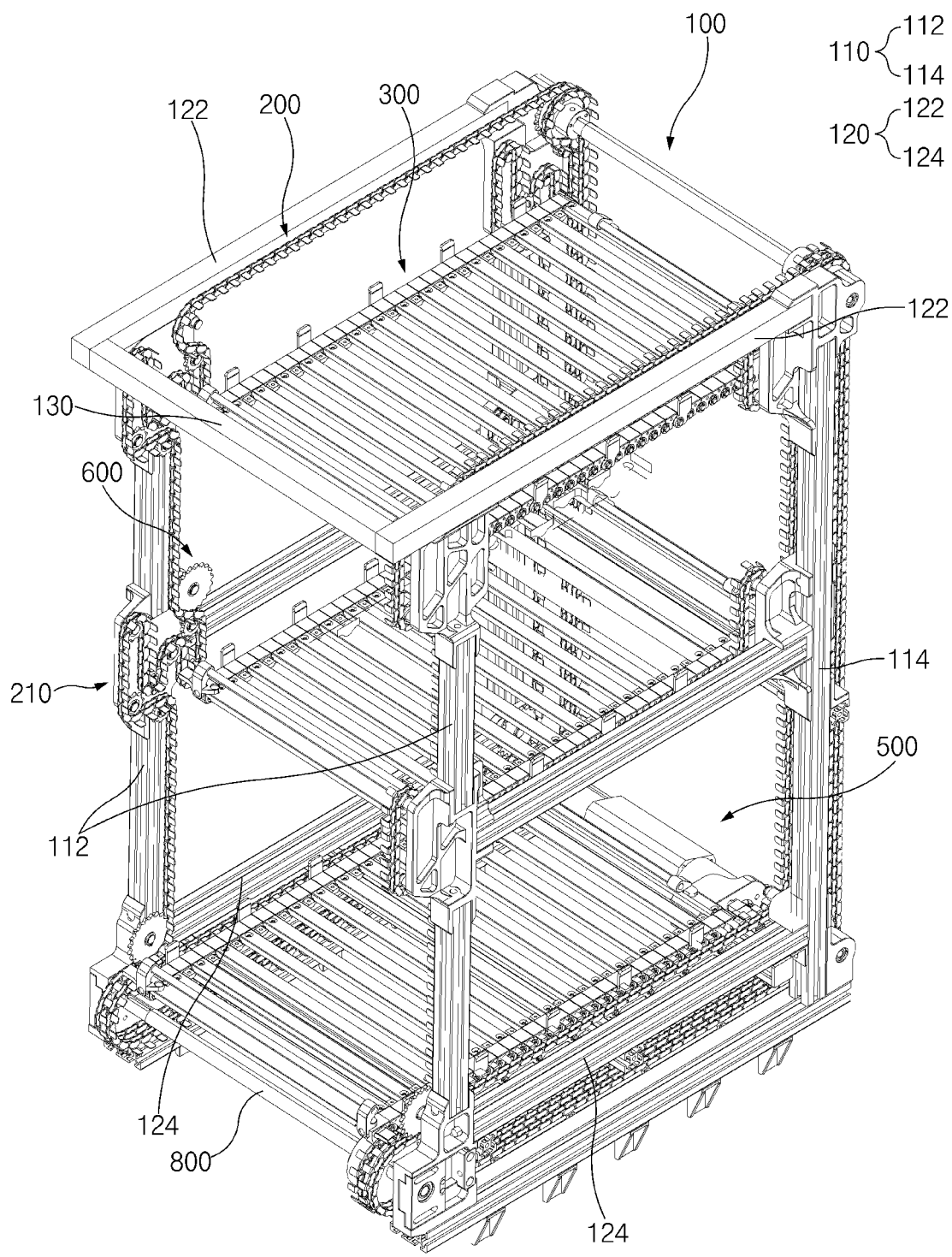
FIG. 2 is a perspective view illustrating a state in which a cabin and a wheel unit are removed from the mobility for delivery according to embodiments of the present disclosure.
Figure 3:
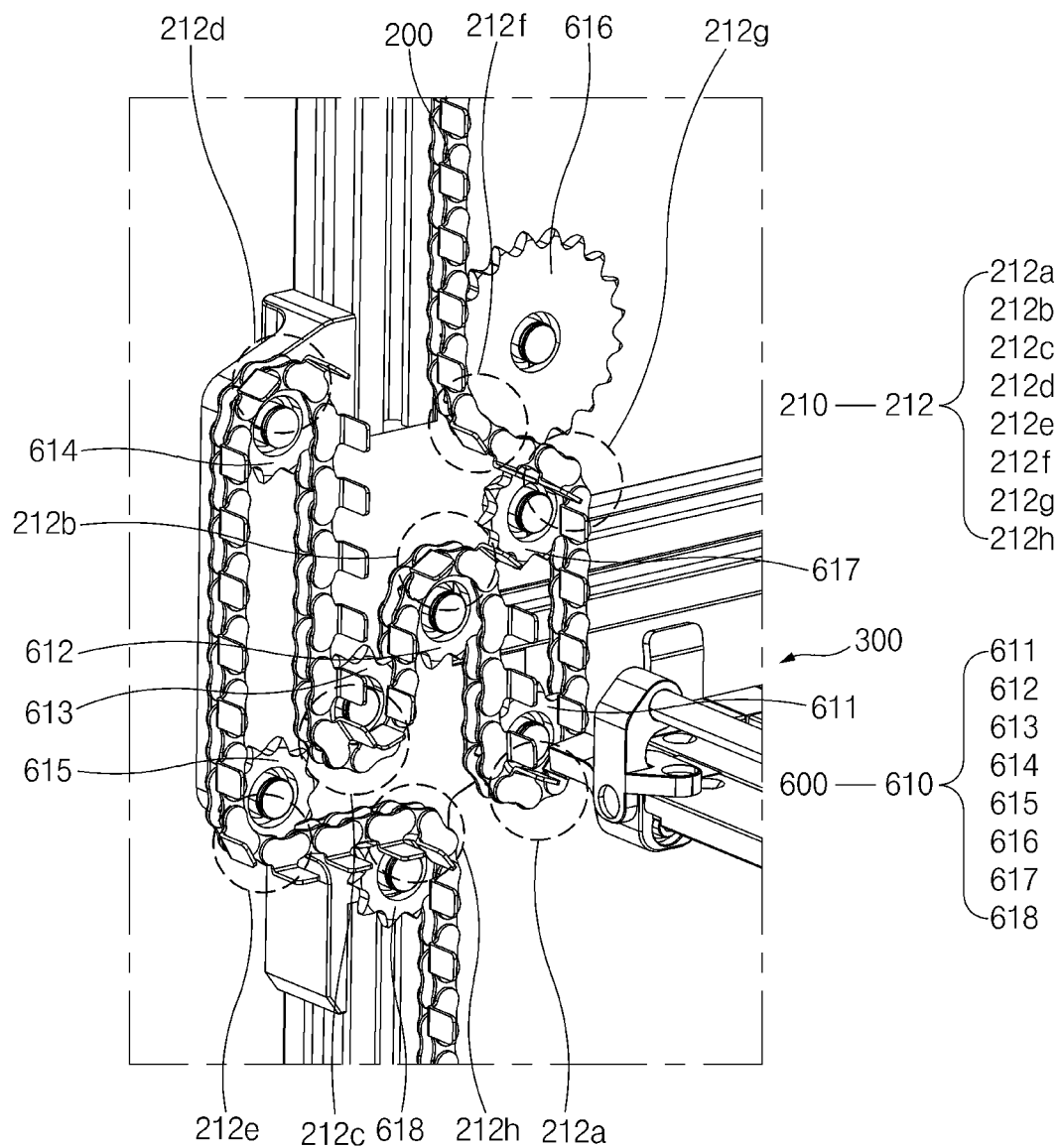
FIG. 3 is an enlarged view illustrating a coupling relationship between a coupling unit and a chain member of the mobility for delivery according to embodiments of the present disclosure.
Figure 4:
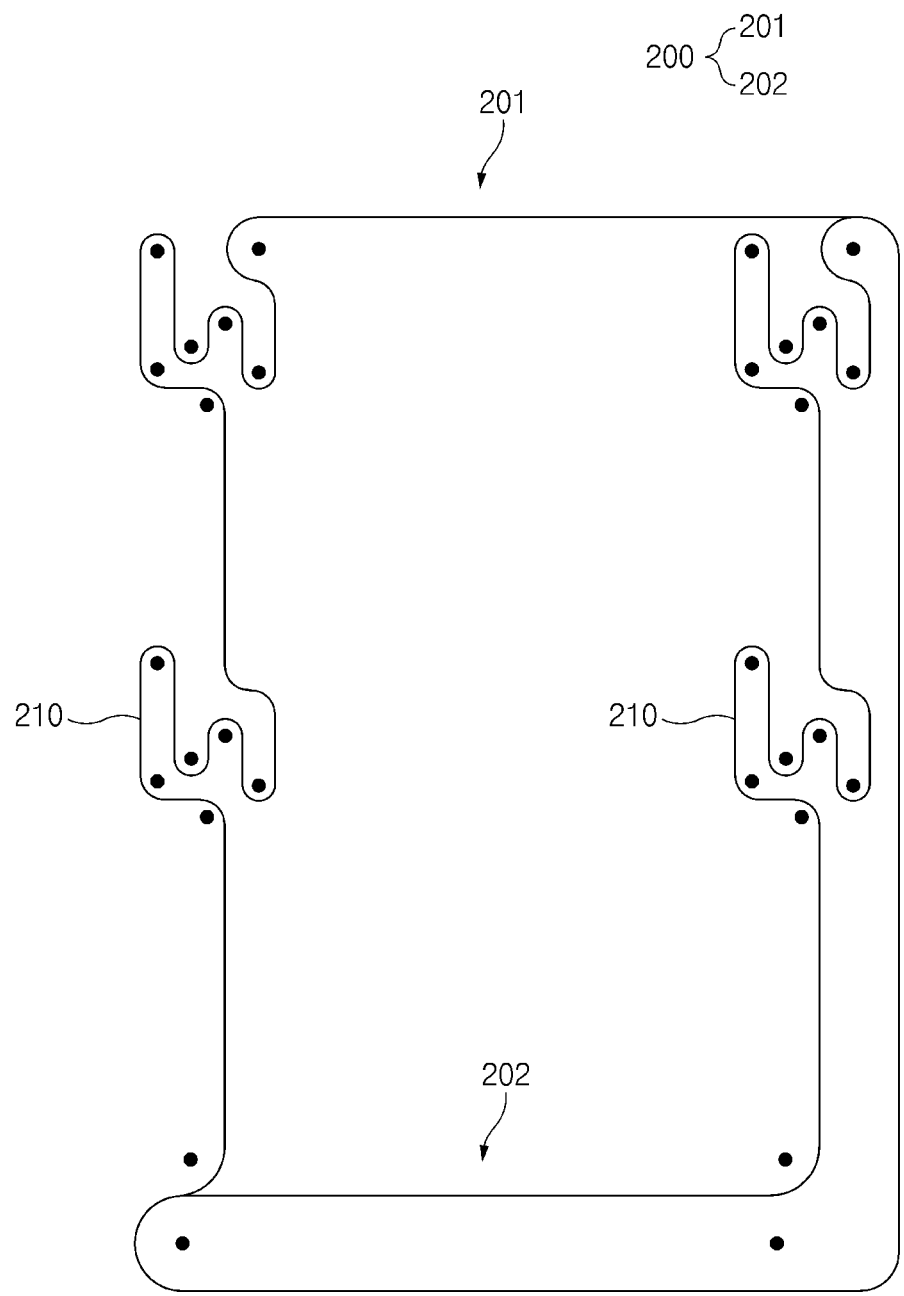
FIG. 4 is a view schematically illustrating a shape in which a first chain member and a second chain member provided in the mobility for delivery according to embodiments of the present disclosure are coupled.

FIG. 1 is a perspective view illustrating a structure of a mobility for delivery according to embodiments of the present disclosure, and FIG. 2 is a perspective view illustrating a state in which a cabin and a wheel unit are removed from the mobility for delivery according to embodiments of the present disclosure. FIG. 3 is an enlarged view illustrating a coupling relationship between a coupling unit and a chain member of the mobility for delivery according to embodiments of the present disclosure, and FIG. 4 is a view schematically illustrating a shape in which a first chain member and a second chain member provided in the mobility for delivery according to embodiments of the present disclosure are coupled.

A mobility 10 for delivery according to embodiments of the present disclosure (hereinafter, referred to as a "mobility") may be configured to deliver an article. As will be described later, the mobility 10 may be provided to allow a plurality of articles disposed in the up-down direction to be sequentially discharged forward. In particular, according to embodiments of the present disclosure, while an article provided at the lower end of the mobility 10 is discharged forward, an article provided in an upper portion of the mobility 10 is in a standby state without moving downward. Accordingly, the height occupied by the mobility 10 in the up-down direction may be minimized.

Referring to FIGS. 1 and 2, the mobility 10 may include a frame unit 100 forming a body of the mobility 10, a chain member 200 which is coupled to one side of the frame unit 100, has a closed curve shape along an up-down direction, and is provided movable relative to the frame unit 100, and a plurality of tray members 300, each of which has one side coupled to the chain member 200 and is provided movable in connection with the movement of the chain member 200. Also, the mobility 10 may further include a cabin 20 for covering the frame unit 100.

The tray member 300 may be configured to support the article. The chain member 200 having the closed curve shape may be configured to convey the tray member 300 in the up-down direction while rotating, but to convey the tray member 300 in the front-rear direction at the lower end of the frame unit 100.

Also, the mobility 10 according to embodiments of the present disclosure may further include a wheel unit 400 coupled to a lower portion of the frame unit 100 and a driving unit 500 (see FIG. 5) providing a driving force to the chain member 200. As will be described later, the chain member 200 may be engaged with a rotary shaft of the driving unit 500. Thus, as the rotary shaft of the driving unit rotates, the chain member 200 may rotate.

Continuing to refer to FIGS. 1 to 3, the chain member 200 provided in the mobility 10 according to embodiments of the present disclosure may include a standby section 210 that includes a plurality of bent areas 212.

During a process in which a tray member 300, which is provided at the lowermost end, of the plurality of tray members 300 provided in the mobility 10 moves forward, the standby section 210 may be configured to allow another tray member 300 to move within a predetermined range and stand by. Accordingly, during a process in which an article provided in the tray member 300 provided at the lowermost end is ejected forward, another tray member 300 provided in an upper portion may be prevented from moving downward. Thus, according to embodiments of the present disclosure, even though the chain member 200 is provided in the mobility 10, during the process in which the article provided in the lowermost tray member 300 is ejected, it is possible to prevent the occurrence of interference between the article and the upper tray member 300 due to the downward movement of another tray member 300. Thus, not only can the height of the mobility 10 be reduced, but a larger number of articles may be delivered and ejected while being stacked in the up-down direction.

Continuing to refer to FIGS. 1 to 3, the standby section 210 described above may be provided at a fixed position with respect to the frame unit 100 irrespective of the movement of the chain member 200. More specifically, the mobility 10 according to embodiments of the present disclosure may include a coupling unit 600 which is coupled to one side of the frame unit 100 and includes one or more rotary members 610 provided revolvably. Here, the standby section 210 may be formed in sections, which engage with the rotary members 610 provided in the coupling unit 600, of the chain member 200. The detailed configuration of the coupling unit boo will be described later.

Meanwhile, referring to FIGS. 1 and 2, the frame unit 100 may be divided into a plurality of areas. More specifically, the frame unit 100 may include an up-down extension area no having a shape extending in an up-down direction and a front-rear extension area 120 having a shape extending in a front-rear direction. Here, the up-down extension area no may include a front up-down extension area 112 provided in the front of the frame unit 100 and a rear up-down extension area 114 provided in the rear of the frame unit 100 and spaced apart rearward from the front up-down extension area 112. Also, the front-rear extension area 120 may include an upper front-rear extension area 122 connecting an upper end of the front up-down extension area 112 and an upper end of the rear up-down extension area 114 and a lower front-rear extension area 124 connecting a lower end of the front up-down extension area 112 and a lower end of the rear up-down extension area 114.

Here, according to embodiments of the present disclosure, the chain member 200 may include a first chain member 201 which has a closed curve shape extending sequentially along longitudinal directions of the front up-down extension area 112, the upper front-rear extension area 122, the rear up-down extension area 114, and the lower front-rear extension area 124. For one example, as illustrated in FIG. 4, the first chain member 201 may have a shape similar to an approximately rectangular shape except for the coupling unit 600.

Also, according to embodiments of the present disclosure, the chain member 200 may further include a second chain member 202 which has a closed curve shape extending sequentially along the longitudinal directions of the rear up-down extension area 114 and the lower front-rear extension area 124. More specifically, the second chain member 202 may have a shape which extends upward along the rear up-down extension area 114 and then extends downward after being bent in an area facing the upper end of the rear up-down extension area 114, and extends forward along the lower front-rear extension area 124 and then extends rearward after being bent in an area facing the front end of the lower front-rear extension area 124. For one example, as illustrated in FIG. 4, the second chain member 202 may have a closed curve shape similar to an L-shape except for the coupling unit 600. FIG. 4 illustrates a state after the first chain member 201 and the second chain member 202 are coupled to the mobility according to embodiments of the present disclosure. FIG. 4 illustrates a state in which two coupling units 600 are provided in each of the first chain member 201 and the second chain member 202. More specifically, the first chain member 201 and the second chain member 202 may be provided with the same number of coupling units 600, and the coupling unit 600 provided in the first chain member 201 and the coupling unit 600 provided in the second chain member 202 may be provided at the same height. This may be to ensure that during a process in which the lowermost tray member 300 ejects an object, an upper tray member 300 is in a standby state while maintaining a state extending along the horizontal direction.

Meanwhile, according to embodiments of the present disclosure, each of the front up-down extension area 112, the rear up-down extension area 114, the upper front-rear extension area 122, and the lower front-rear extension area 124, which have been described above, may be provided in a pair respectively in a left area and a right area of the frame unit 100. Here, as illustrated in FIGS. 1 and 2, the frame unit 100 may further include a left-right extension area 130 that connects the left area and the right area of the frame unit 100.

Hereinafter, the shape of the coupling unit 600 according to embodiments of the present disclosure will be described.

As illustrated in FIG. 3, the rotary members 610 provided in the coupling unit 600 may include a first rotary member 611 and a second rotary member 612 provided above the first rotary member 611. Here, the bent areas 212 provided in the standby section 210 of the chain member 200 may include a first bent area 212a formed in a manner in which the chain member 200 extends downward and is then bent upward after surrounding a lower area of the first rotary member 611 and a second bent area 212b formed in a manner in which the chain member 200, which passes through the first bent area 212a and extends to the second rotary member 612, extends upward from the first rotary member 611 to the second rotary member 612 and is then bent downward after surrounding an upper area of the second rotary member 612.

Also, the rotary members 610 may further include a third rotary member 613 provided below the second rotary member 612. Here, the bent areas 212 may further include a third bent area 212c formed in a manner in which the chain member 200, which passes through the second bent area 212b, and extends to the third rotary member 613, extends downward from the second rotary member 612 to the third rotary member 613 and is then bent upward after surrounding a lower area of the third rotary member 613.

Also, the rotary members 610 may further include a fourth rotary member 614 provided above the third rotary member 613. Here, the bent areas 212 may further include a fourth bent area 212d formed in a manner in which the chain member 200, which passes through the third bent area 212c and extends to the fourth rotary member 614, extends upward from the third rotary member 613 to the fourth rotary member 614 and is then bent downward after surrounding an upper area of the fourth rotary member 614.

Also, the rotary members 610 may further include a fifth rotary member 615 provided below the fourth rotary member 614. Here, the bent areas 212 may further include a fifth bent area 212e formed in a manner in which the chain member 200, which passes through the fourth bent area 212d and extends to the fifth rotary member 615, extends downward from the fourth rotary member 614 to the fifth rotary member 615 and is then bent after surrounding a lower area of the fifth rotary member 615. For one example, as illustrated in FIG. 3, the fifth bent area 212e may have a shape that is bent rearward after surrounding the lower area of the fifth rotary member 615.

Here, referring to FIG. 3, the first rotary member 611 may be provided behind the second rotary member 612, the second rotary member 612 may be provided behind the third rotary member 613, and the third rotary member 613 may be provided behind the fourth rotary member 614. However, unlike those illustrated in the drawing, the first rotary member 611 may be provided in front of the second rotary member 612, the second rotary member 612 may be provided in front of the third rotary member 613, and the third rotary member 613 may be provided in front of the fourth rotary member 614.

Meanwhile, as illustrated in FIG. 3, the rotary members 610 may further include a sixth rotary member 616 provided above the first rotary member 611. Here, the bent areas 212 may further include a sixth bent area 212f which is bent rearward after surrounding a front area of the sixth rotary member 616.

Also, the rotary members 610 may further include a seventh rotary member 617 provided between the first rotary member 611 and the sixth rotary member 616 with respect to the extension direction of the chain member 200. Here, the bent areas 212 may further include a seventh bent area 212g formed in a manner in which the chain member 200, which passes through the sixth bent area 212f and extends to the seventh rotary member 617, extends rearward from the sixth rotary member 616 to the seventh rotary member 617 and is then bent downward after surrounding an upper area of the seventh rotary member 617. The chain member 200 extending downward from the seventh bent area 212g may extend to the first rotary member 611 described above.

Also, the rotary members 610 may further include an eighth rotary member 618 provided behind the fifth rotary member 615. Here, the bent areas 212 may further include an eighth bent area 212h formed in a manner in which the chain member 200, which passes through the fifth bent area 212e and extends to the eighth rotary member 618, extends rearward from the fifth rotary member 615 to the eighth rotary member 618 and is then bent downward after surrounding an upper area of the eighth rotary member 618.

Summarizing the above, the standby section 210 may be defined as sections in which the chain member 200 extends between the rotary members provided in the coupling unit. More generally, the standby section 210 is defined as a section that extends from the rotary member provided in the most upstream area to the rotary member provided in the most downstream area on the basis of the direction in which the chain member 200 extends. On the basis of FIG. 3, the standby section 210 is a section, which extends from the sixth rotary member 616 to the eighth rotary member 618, of the chain member 200.

Meanwhile, as illustrated in FIG. 3, the outer circumferential surface of the rotary member 610 provided in the coupling unit 600 may have a sawtooth-like shape. This may be to ensure that the rotary member 610 is effectively engaged with the chain member 200, thereby preventing the chain member 200 from slipping on the rotary member 610.

Meanwhile, according to embodiments of the present disclosure, the coupling unit 600 and the standby section 210 may be provided in plurality in each of the front up-down extension area 112 and the rear up-down extension area 114. As illustrated in FIGS. 1, 2, and 4, two coupling units 600 and two standby sections 210 may be provided in each of the front up-down extension area 112 and the rear up-down extension area 114.

Figure 5:
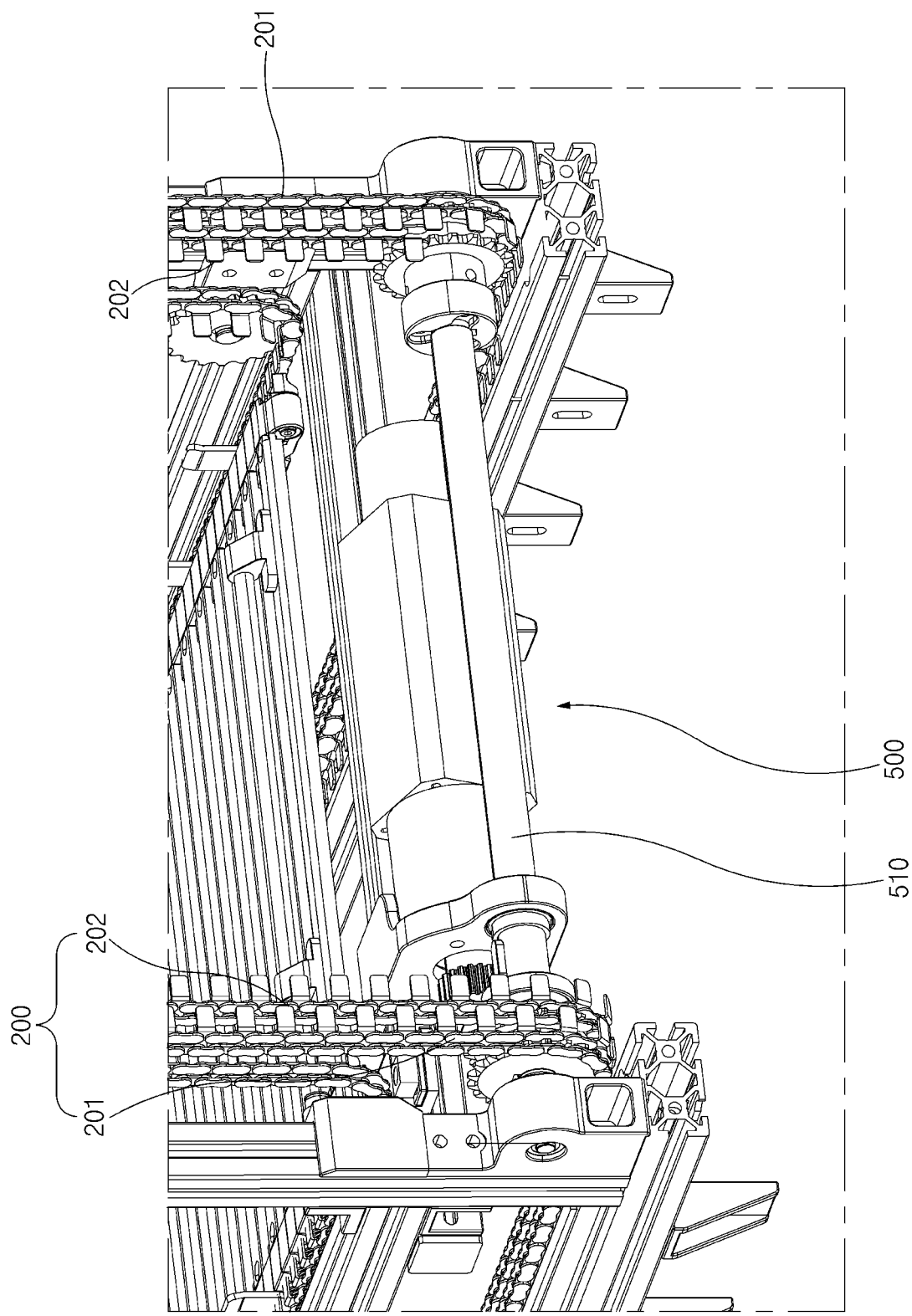
FIG. 5 is an enlarged view illustrating a driving unit provided in the mobility for delivery according to embodiments of the present disclosure.

FIG. 5 is an enlarged view illustrating a driving unit provided in the mobility for delivery according to embodiments of the present disclosure.

As illustrated in FIG. 5, the driving unit 500 may include a first rotary shaft 510 provided in a rear end portion of the lower front-rear extension area 124 (see FIGS. 1 and 2). The first rotary shaft 510 may be configured to be directly rotated by power inside the driving unit 500.

Here, the first chain member 201 and the second chain member 202 may be engaged with the first rotary shaft 510. Thus, the first chain member 201 and the second chain member 202 may rotate in connection with the rotation of the first rotary shaft 510, and accordingly, the tray member 300 may also move. For one example, as illustrated in FIG. 5, the first chain member 201 may be provided outside the second chain member 202 in the left-right direction. However, unlike those illustrated in FIG. 5, the first chain member 201 may be provided inside the second chain member 202 in the left-right direction.

Figure 6:
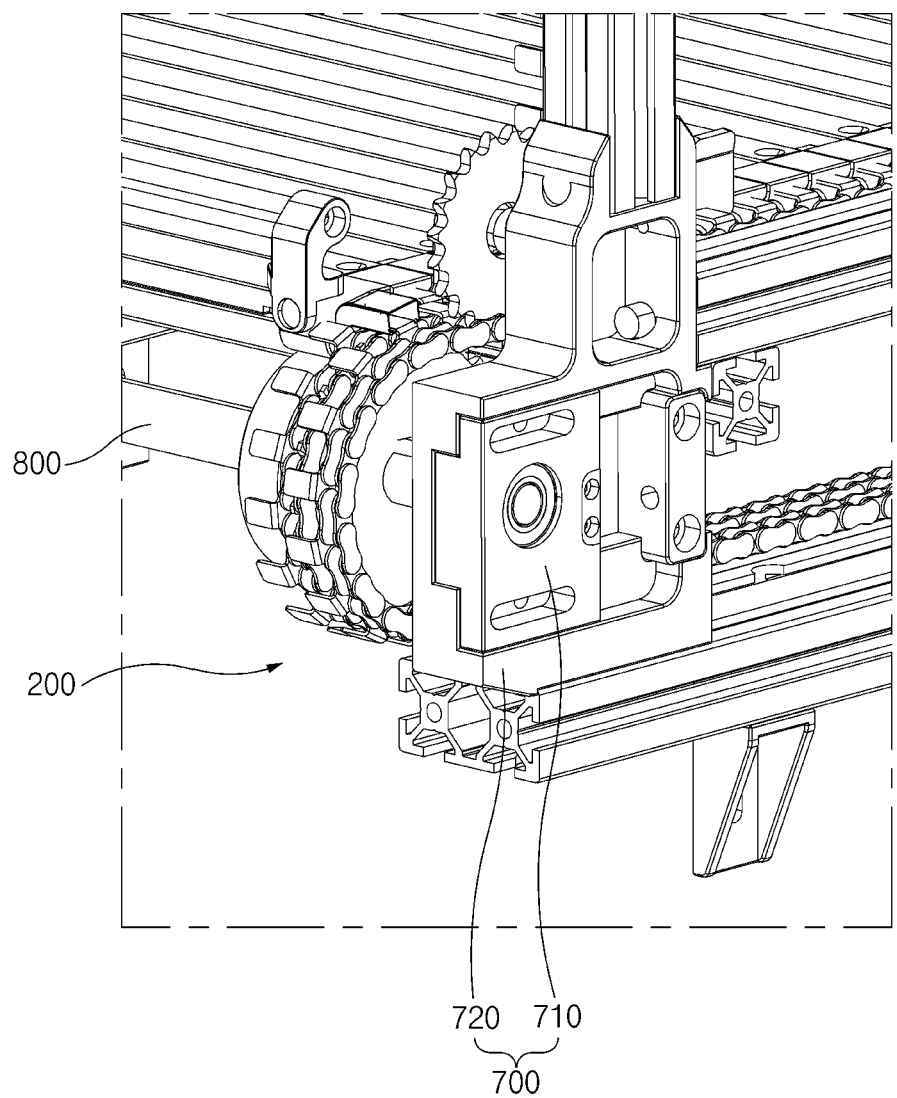
FIG. 6 is an enlarged view illustrating a tension adjustment unit provided in a mobility for delivery according to embodiments of the present disclosure.

FIG. 6 is an enlarged view illustrating a tension adjustment unit provided in a mobility for delivery according to embodiments of the present disclosure.

Referring to FIGS. 1, 2, and 6, the mobility 10 according to embodiments of the present disclosure may further include a tension adjustment unit 700 coupled to the lower front-rear extension area 124 and a second rotary shaft 800 coupled to a front end portion of the lower front-rear extension area 124 and engaged with the chain member 200. More specifically, the second rotary shaft 800 may be engaged with both the first chain member 201 and the second chain member 202.

When the chain member 200 is rotated due to the rotation of the first rotary shaft 510, the second rotary shaft 800 also rotates together in connection with the rotation of the chain member 200.

The tension adjustment unit 700 may be coupled to the second rotary shaft 800 to move the second rotary shaft 800 in the front-rear direction. Thus, the tension adjustment unit 700 may be configured to move the second rotary shaft 800 in the front-rear direction, and thus, the front end portion of the chain member 200 engaged with the second rotary shaft 800 is moved in the front-rear direction, and accordingly, tension of the chain member 200 may be adjusted. For one example, a first through-hole corresponding to the size of the second rotary shaft 800 is formed in a first component 710 of the tension adjustment unit 700, and the second rotary shaft 800 may be coupled and fixed to the first component 710. Also, a second through-hole having a shape extending in the front-rear direction may be formed in a second component 720 of the tension adjustment unit 700 so that the second rotary shaft 800 can move in the front-rear direction. Also, the first component 710 may be coupled to the inside of the second component 720. Thus, as the second rotary shaft 800 moves along the second through-hole in the front-rear direction, the tension of the chain member 200 may be adjusted.

Figure 7:
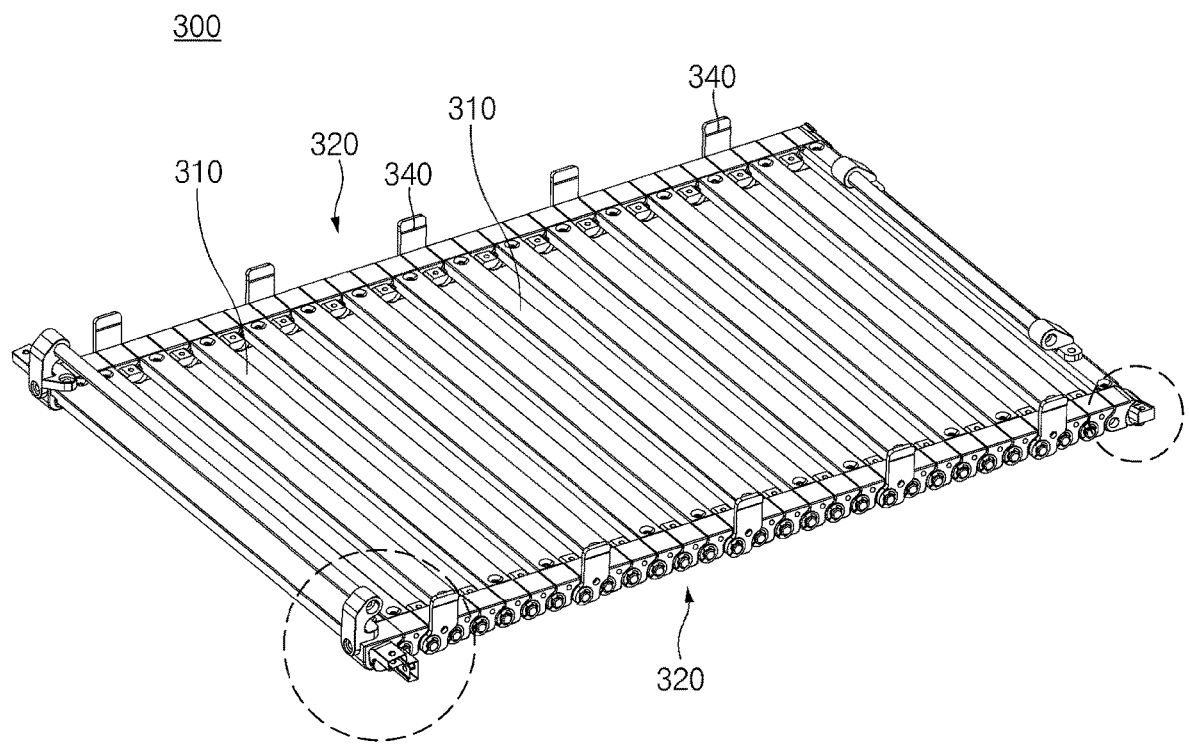
FIG. 7 is a perspective view illustrating a tray member provided in a mobility for delivery according to embodiments of the present disclosure.
Figure 8:
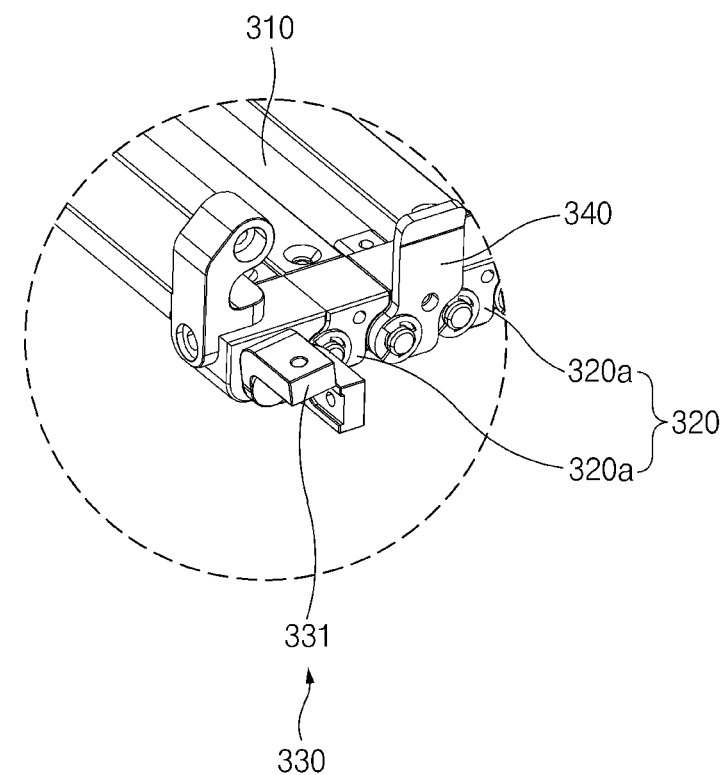
FIG. 8 is an enlarged view illustrating a front area of the tray member provided in the mobility for delivery according to embodiments of the present disclosure.

FIG. 7 is a perspective view illustrating a tray member provided in a mobility for delivery according to embodiments of the present disclosure, and FIG. 8 is an enlarged view illustrating a front area of the tray member provided in the mobility for delivery according to embodiments of the present disclosure. Also, FIG. 9 is an enlarged view illustrating a rear area of the tray member provided in the mobility for delivery according to embodiments of the present disclosure.

Figure 9:
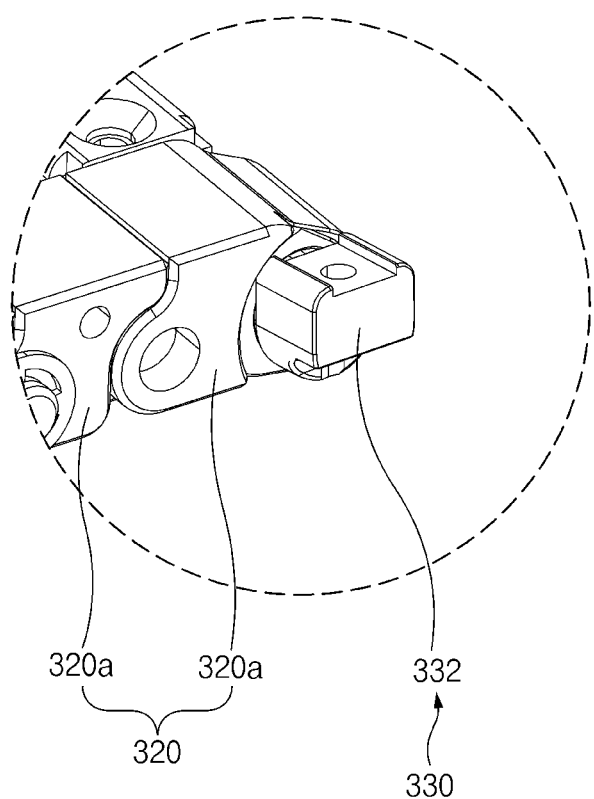
FIG. 9 is an enlarged view illustrating a rear area of the tray member provided in the mobility for delivery according to embodiments of the present disclosure.

Referring to FIGS. 7 to 9, the tray member 300 may include a plurality of rods 310, which each have a shape extending in the left-right direction and are sequentially arrayed along the front-rear direction, and a link module 320 coupled to each of both left and right end portions of the plurality of rods 310. Here, the link module 320 may include a plurality of links 320a sequentially arrayed along the front-rear direction.

Here, according to embodiments of the present disclosure, two neighboring links of the plurality of links 320a may be coupled rotatable in the vertical direction relative to each other. For one example, the link module 320 may be a cableveyor having a shape in which the plurality of links 320a are coupled. More preferably, the link module 320 may be a cableveyor which may not be bent upward on the basis of FIG. 7, but bent downward.

Also, as illustrated in FIGS. 8 and 9, the tray member 300 may further include a connection block 330 provided in at least one of the plurality of links 320a provided in the link module 320. Thus, according to embodiments of the present disclosure, the tray member 300 may be coupled to each of the first chain member 201 and the second chain member 202 through the connection block 330.

More specifically, referring to FIGS. 8 and 9, the connection block 330 may include a front connection block 331 provided in a front area of the link module 320 and a rear connection block 332 provided in a rear area of the link module 320. Here, the front connection block 331 may be coupled to the first chain member 201, and the rear connection block 332 may be coupled to the second chain member 202.

As described above, the first chain member 201 may be provided outside the second chain member 202 in the left-right direction. Thus, the front connection block 331 coupled to the first chain member 201 may protrude further outward in the left-right direction than the rear connection block 332 coupled to the second chain member 202.

Also, as illustrated in FIG. 7, the tray member 300 may further include an upward protruding block 340 that protrudes upward from the link module 320. The upward protruding block 340 may be configured to prevent an object loaded over the tray member 300 from escaping outward in the left-right direction.

Meanwhile, referring to FIGS. 1 and 2, when all of the plurality of rods 310 provided in any one tray member of the plurality of tray members 300 provided in the mobility 10 are arrayed along the front-rear direction, all of the plurality of rods 310 provided in another tray member of the plurality of tray members 300 may also be arrayed along the front-rear direction. This may be to allow objects to be simultaneously loaded on the plurality of respective tray members 300 provided in the mobility 10 according to embodiments of the present disclosure, thereby maximizing the number of objects that the mobility 10 can load.

Also, according to embodiments of the present disclosure, when all of the plurality of rods provided in each of the plurality of tray members 300 are arrayed in parallel along the front-rear direction, each of a length of the standby section 210 of the first chain member 201 and a length of the standby section 210 of the second chain member 202 may be greater than a length of the frame unit 100 in the front-rear direction. This may be to ensure that during a process of ejecting an object by moving forward the tray member 300 provided at the lowermost end in the mobility 10, the tray member 300 provided above the tray member 300 provided at the lowermost end is prevented from moving downward. Accordingly, the interference between the object being ejected and the tray member 300 provided above does not occur.

On the basis of the above description and the illustration of drawings, an operation example of the mobility 10 for delivery according to embodiments of the present disclosure will be described.

As illustrated in FIGS. 1 and 2, in a state in which a plurality of tray members 300 are arrayed in parallel to the front-rear direction, an object to be delivered is loaded on each of the tray members 300, and the mobility 10 moves to a destination. Here, except for the tray member provided at the lowermost end, front end portions of the plurality of tray members 300 face the coupling unit 600 provided in the first chain member 201, and rear end portions of the plurality of tray members 300 face the coupling unit 600 provided in the second chain member 202.

When the mobility 10 arrives at the destination, the driving unit 500 is driven to eject the objects, and the first rotary shaft 510 rotates. Accordingly, the first chain member 201 and the second chain member 202 rotate. More specifically, as illustrated in FIG. 4, the first chain member 201 and the second chain member 202 rotate in the clockwise direction. Accordingly, the tray member 300 provided at the lowermost end moves forward, and accordingly, the object also moves forward. Here, an area, which arrives at the front end portion, of the tray member 300 is bent downward and then moves rearward. This bending is possible because the plurality of links 320a provided in the link module 320 are connected rotatably to each other so as to be bent downward.

Also, while the tray member 300 provided at the lowermost end moves forward, the tray member 300 provided above does not move downward and maintains a predetermined distance or more from the tray member 300 provided at the lowermost end.

That is, according to embodiments of the present disclosure, while the tray member 300 provided at the lowermost end moves forward, areas, which pass through the standby section 210 provided in the coupling unit 600, of the first chain member 201 and the second chain member 202 move in the up, down, front, and rear directions along a path of the standby section 210. Accordingly, the tray member 300 coupled to the standby section 210 also moves in the up, down, front, and rear directions along the path of the standby section 210. Thus, according to embodiments of the present disclosure, even while the tray member 300 provided at the lowermost end moves forward, the tray member 300 does not move downward.

Here, as described above, each of the length of the standby section 210 provided in the first chain member 201 and the length of the standby section 210 provided in the second chain member 202 is greater than the length of the frame unit 100 in the front-rear direction. Thus, until the object loaded to the tray member 300 provided at the lowermost end is completely ejected, the upper tray member 300 stands by in an upper area while moving along the path of the standby section 210.

When the movement of the upper tray member 300 along the path of the standby section 210 is completed, the upper tray member 300 moves downward and becomes the lowermost tray member 300. Subsequently, the above-described processes are repeated.

According to embodiments of the present disclosure, the height of the mobility for delivery, on which the plurality of articles are stacked in the up-down direction and which can sequentially eject the plurality of articles, may be reduced.

Although the present disclosure has been described with specific exemplary embodiments and drawings, the present disclosure is not limited thereto, and it is obvious that various changes and modifications may be made by a person skilled in the art to which the present disclosure pertains within the technical idea of the present disclosure and equivalent scope of the appended claims.

What is claimed is:

1. A mobility for delivering articles, the mobility comprising:
a frame defining a body of the mobility;
a chain member coupled to a first side of the frame, wherein the chain member has a closed curve shape along an up-down direction, is movable relative to the frame, and comprises a standby section provided at a fixed position with respect to the frame irrespective of a movement of the chain member, wherein the standby section comprises a plurality of bent areas;
a tray member having a first side coupled to the chain member, the tray member being movable in connection with a movement of the chain member;
a wheel coupled to a lower portion of the frame; and
a driver configured to provide a driving force to the chain member.

2. The mobility of claim 1, further comprising a coupling unit coupled to the first side of the frame and comprising one or more rotary members provided revolvably, wherein the standby section of the chain member comprises sections configured to engage with the rotary members of the coupling unit.

3. The mobility of claim 2, wherein:
the rotary members comprise a first rotary member and a second rotary member disposed above the first rotary member; and
the bent areas comprise:
a first bent area in which the chain member extends downward and is then bent upward after surrounding a lower area of the first rotary member; and
a second bent area in which the chain member that passes through the first bent area and extends to the second rotary member extends upward from the first rotary member to the second rotary member and is then bent downward after surrounding an upper area of the second rotary member.

4. The mobility of claim 3, wherein:
the rotary members further comprise a third rotary member disposed below the second rotary member; and
the bent areas further comprise a third bent area in which the chain member that passes through the second bent area and extends to the third rotary member extends downward from the second rotary member to the third rotary member and is then bent upward after surrounding a lower area of the third rotary member.

5. The mobility of claim 4, wherein:
the rotary members further comprise a fourth rotary member disposed above the third rotary member; and
the bent areas further comprise a fourth bent area in which the chain member that passes through the third bent area and extends to the fourth rotary member extends upward from the third rotary member to the fourth rotary member and is then bent downward after surrounding an upper area of the fourth rotary member.

6. The mobility of claim 5, wherein:
the rotary members further comprise a fifth rotary member disposed below the fourth rotary member; and
the bent areas further comprise a fifth bent area in which the chain member that passes through the fourth bent area and extends to the fifth rotary member extends downward from the fourth rotary member to the fifth rotary member and is then bent after surrounding a lower area of the fifth rotary member.

7. The mobility of claim 6, wherein:
the first rotary member is disposed behind the second rotary member;
the second rotary member is disposed behind the third rotary member; and
the third rotary member is disposed behind the fourth rotary member.

8. The mobility of claim 7, wherein the fifth bent area has a shape that is bent rearward after surrounding the lower area of the fifth rotary member.

9. A mobility for delivering articles, the mobility comprising:
a frame defining a body of the mobility, the frame comprising:
an up-down extension area having a shape extending in an up-down direction, the up-down extension area comprising:
a front up-down extension area disposed at a front of the frame; and
a rear up-down extension area disposed at a rear of the frame; and a front-rear extension area having a shape extending in a front-rear direction, the front-rear extension area comprising:
an upper front-rear extension area configured to connect an upper end of the front up-down extension area and an upper end of the rear up-down extension area; and
a lower front-rear extension area configured to connect a lower end of the front up-down extension area and a lower end of the rear up-down extension area;
a chain member coupled to a first side of the frame, wherein the chain member:
has a closed curve shape along the up-down direction; is movable relative to the frame; and
comprises a standby section provided at a fixed position with respect to the frame irrespective of a movement of the chain member, wherein the standby section comprises a plurality of bent areas; and
comprises a first chain member having the closed curve shape extending sequentially along longitudinal directions of the front up-down extension area, the upper front-rear extension area, the rear up-down extension area, and the lower front-rear extension area;
a tray member having a first side coupled to the chain member, the tray member being movable in connection with a movement of the chain member;
a wheel coupled to a lower portion of the frame;
a driver configured to provide a driving force to the chain member; and
a coupling unit coupled to the first side of the frame and comprising one or more rotary members provided revolvably, wherein the standby section of the chain member comprises sections configured to engage with the rotary members of the coupling unit.

10. The mobility of claim 9, wherein the chain member further comprises a second chain member having the closed curve shape extending sequentially along the longitudinal directions of the rear up-down extension area and the lower front-rear extension area, wherein the second chain member extends upward along the rear up-down extension area and then extends downward after being bent in an area facing the upper end of the rear up-down extension area, and extends forward along the lower front-rear extension area and then extends rearward after being bent in an area facing a front end of the lower front-rear extension area.

11. The mobility of claim 10, wherein:
each of the front up-down extension area, the rear up-down extension area, the upper front-rear extension area, and the lower front-rear extension area is provided in a pair respectively in a left area and a right area of the frame; and
the frame further comprises a left-right extension area connecting the left area and the right area of the frame.

12. The mobility of claim 10, wherein the tray member comprises:
a plurality of rods each having a shape extending in a left-right direction and sequentially arrayed along the front-rear direction; and
a link module coupled to left and right end portions of the plurality of rods, wherein the link module comprises a plurality of links sequentially arrayed along the front-rear direction and two neighboring links of the plurality of links are coupled rotatably relative to each other.

13. The mobility of claim 12, wherein:
the tray member further comprises a connection block provided in at least one of the plurality of links of the link module; and
the tray member is coupled to each of the first chain member and the second chain member through the connection block.

14. The mobility of claim 13, wherein the connection block comprises:
a front connection block disposed in a front area of the link module and coupled to the first chain member; and
a rear connection block disposed in a rear area of the link module and coupled to the second chain member.

15. The mobility of claim 12, wherein the tray member further comprises an upward protruding block that protrudes upward from the link module.

16. The mobility of claim 12, wherein:
the coupling unit and the standby section are provided in plurality in each of the front up-down extension area and the rear up-down extension area; and
the tray member is provided in plurality.

17. The mobility of claim 16, wherein in a state in which all of the plurality of rods provided in any one tray member of the plurality of tray members are arrayed along the front-rear direction, all of the plurality of rods provided in another tray member of the plurality of tray members are also arrayed along the front-rear direction.

18. The mobility of claim 17, wherein in a state in which all of the plurality of rods provided in each of the plurality of tray members are arrayed along the front-rear direction, each of a length of the standby section of the first chain member and a length of the standby section of the second chain member is greater than a length of the frame in the front-rear direction.

19. The mobility of claim 10, wherein:
the driver comprises a first rotary shaft disposed in a rear end portion of the lower front-rear extension area;
the first chain member and the second chain member are engaged with the first rotary shaft; and
the first chain member is provided outside the second chain member in a left-right direction.

20. The mobility of claim 9, further comprising:
a tension adjustment unit coupled to the lower front-rear extension area; and
a second rotary shaft coupled to a front end portion of the lower front-rear extension area and engaged with the chain member, wherein the tension adjustment unit is coupled to the second rotary shaft and configured to move the second rotary shaft in the front-rear direction.

* * * * *